United States Patent
Tapp et al.

[15] 3,698,560
[45] Oct. 17, 1972

[54] HOLLOW FIBER, ARTIFICIAL KIDNEY WITH DISPOSABLE DIALYZING CARTRIDGE

[72] Inventors: James S. Tapp, Decatur, Ala.; George L. Beemsterboer; Ival O. Salyer, both of Dayton, Ohio

[73] Assignee: The United States of America as represented by the Secretary of the Department of Health, Education and Welfare

[22] Filed: Dec. 28, 1970

[21] Appl. No.: 101,719

[52] U.S. Cl. ............... 210/321, 210/450, 264/258
[51] Int. Cl. ............................................. B01d 31/00
[58] Field of Search ....... 264/258; 210/22, 321, 446, 210/450, 232

[56] References Cited

UNITED STATES PATENTS

| | | |
|---|---|---|
| 3,373,876 | 3/1968 | Stewart......................210/321 |
| 3,228,876 | 1/1966 | Mahon........................210/22 |
| 3,442,002 | 5/1969 | Geary, Jr. et al. .....210/321 X |

Primary Examiner—Frank A. Spear, Jr.
Attorney—L. Bruce Stevens, Jr. and Frank D. Shearin

[57] ABSTRACT

A hollow-fiber, artificial kidney with a disposable dialyzing cartridge comprising a cylindrical body, a disposable dialyzing cartridge positioned during use within the body and having hollow dialyzing fibers therein, and flanges and other means to hold the assembled parts of the kidney in place.

6 Claims, 1 Drawing Figure

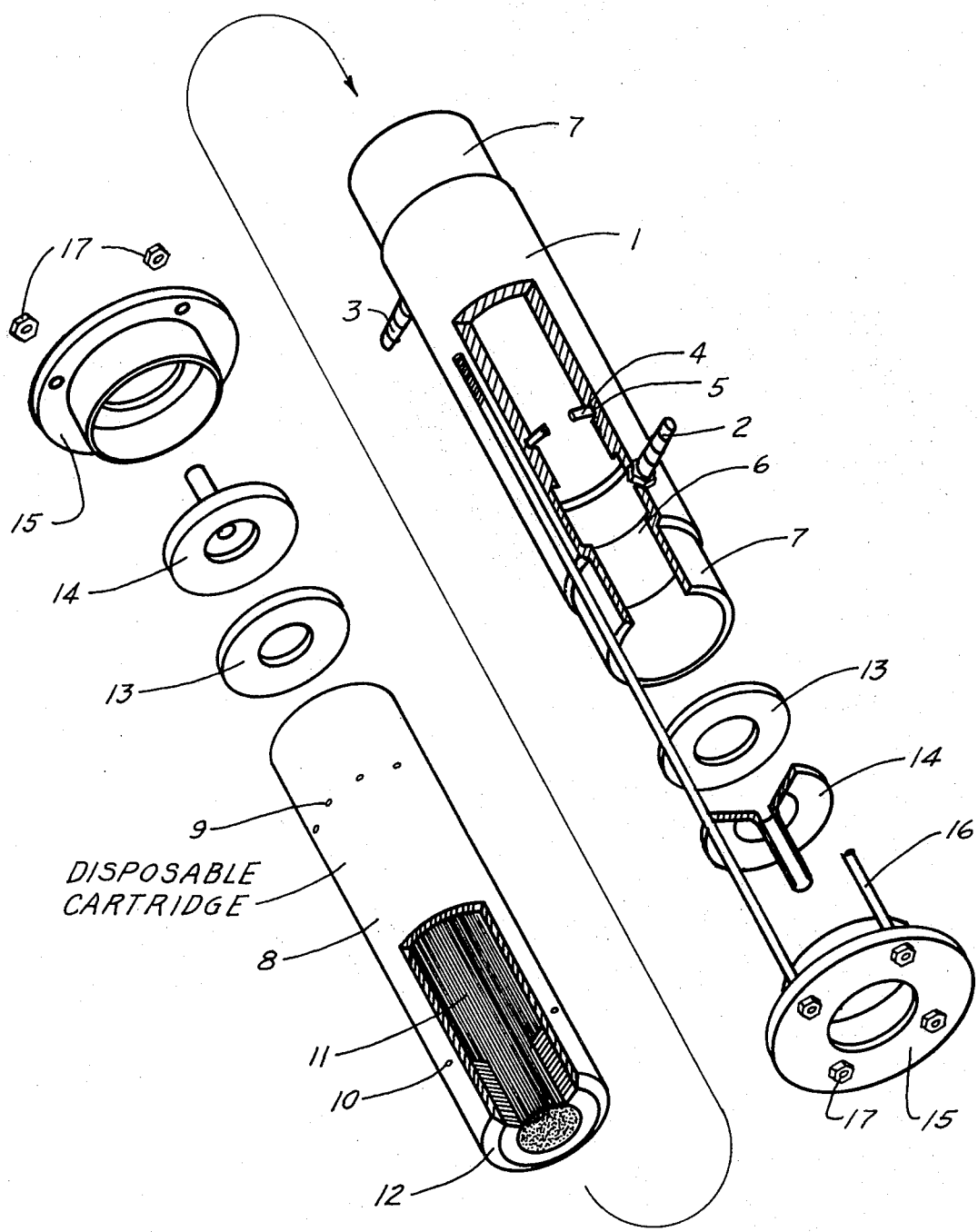

HOLLOW FIBER, ARTIFICIAL KIDNEY WITH DISPOSABLE DIALYZING CARTRIDGE

CROSS-REFERENCE TO RELATED APPLICATIONS

Copending applications, Ser. No. 102,092 and 102,132 of even date describes and claims non-thrombogenic hollow-fiber hemodialysis membranes which can be used as the hollow fibers for the dialyzing cartridge of the artificial kidney of this application.

BACKGROUND OF THE INVENTION

The invention described herein was made in the course of, or under, a contract with the Department of Health, Education, and Welfare.

1. Field of the Invention

The invention relates to liquid purification and separation, and especially to semi-permeable membranes and is useful in the dialysis art and especially in the hemo-dialysis or artificial kidney art.

2. Description of the Prior Art

Typical hollow-fiber, artificial kidneys of the prior art are those described in U.S. Pat. Nos. 3,373,876, 3,422,008 and 3,455,460.

SUMMARY OF THE INVENTION

A hollow-fiber, artificial kidney with a disposable dialyzing cartridge comprising a first elongated hollow body open at both ends, having inlet and outlet ports near opposite ends of said body, and a gasket located in the inner wall of said body between the inlet and outlet ports to prevent dialyzing fluid from going directly from inlet to outlet; a disposable dialyzing cartridge comprising a second elongated hollow body, sized to be inserted and removed from inside said first body, having one or more openings on the side near each end positioned to communicate with the inlet and outlet ports of said first body, and hollow dialyzing fibers running longitudinally inside said second body and potted with resin into a reduced internal opening near at end to prevent leakage of dialyzing fluid around the fibers and out of either end; a gasket at each end of said first and second bodies to prevent dialyzing fluid from leaking into blood, a flange at each end of said bodies and means joining said flanges to hold said bodies and the gaskets at each end in place. Preferred shape for the bodies of the kidney are cylindrical and it is also preferred that the kidney include a necked-down longitudinal portion adjacent each end gasket to facilitate connecting the kidney for use.

BRIEF DESCRIPTION OF THE DRAWING

The drawing is an exploded view partially in section of the artificial kidney of the invention.

DESCRIPTION OF THE PREFERRED EMBODIMENTS

Referring to the drawing, hollow cylindrical body 1 forms the outer shell of the kidney. Portions 7 at either end of body 1 are of reduced external diameter to accommodate flanges 15. Inlet port 2 communicates from outside body 1 to the inside with circumferential channel 6 for the purpose of introducing dialyzing fluid to the disposable cartridge. Gasket 4, an O-ring, is positioned in a circumferential channel 5 in the inner surface of body 1 for the purpose of preventing dialysis fluid from passing directly from inlet port 2 to outlet port 3 when the disposable cartridge is in place. Outlet port 3 is an opening similar to port 2 communicating with a similar circumferential channel in the inner surface of body 1 and is for the purpose of removing dialysis fluid.

Body 8 of the disposable cartridge is a hollow cylindrical body of the same length as body 1. The internal diameter of body 8 is larger in the central portion than at each end to facilitate the potting of hollow-fibers 11 into each end of body 8 providing a seal so that dialysis fluid cannot leak out from inside through the ends to contaminate blood being processed. Inlet openings 10 are positioned circumferentially on body 8 communicating from outside to inside the body and openings 10 are positioned to communicate with channel 6 of body 1 when the artificial kidney is assembled. Openings 9 are similar to openings 10, but are positioned near the other end of body 8 to communicate with outlet port 3 of body 1 when the kidney is assembled. Body 8 is beveled at each end with a bevel such as 12 to facilitate the insertion of the disposable cartridge to body 1. Gaskets 13 positioned at each end of bodies 1 and 8 when assembled serve to prevent dialysis fluid from leaking from either end between the outside surface of body 8 and the inside surface of body 1. Necked-down portions 14 positioned between gaskets 13 and flanges 15 serve for the purpose of connecting the artificial kidney for use with tubing. Flanges 15, rods 16 threaded at each end, and nuts 17 serve to hold the assembled portions of the artificial kidney firmly in place and prevent leakage.

Hollow fibers useful in the artificial kidney of this invention are described in our copending applications, Ser. No. 102,092 and 102,132 of even date. These fibers are prepared from quaternized membranes of polymers made from monomeric substances of which at least a sufficient amount of a vinylpyridine is included to provide membranes which on heparinization are non-thrombogenic and at least 50% is acrylonitrile, particularly polymers made from monomeric substances of which from 2 percent to 10 percent by weight of the total monomer is a vinylpyridine and at least 80 percent by weight is acrylonitrile. Both the quaternized and the heparinized polymers are useful in artificial kidneys; however, if only the quaternized polymers are used, it is necessary to heparinize the patient to prevent clotting of the blood being processed. Other types of hollow fibers can also be used in the artificial kidney of this invention such as those fibers described in U.S. Pat. No. 3,441,142; however, the preferred fibers are those described in our copending application.

It is preferred that all parts of the artificial kidney which come in contact with blood be non-thrombogenic, otherwise the patient's blood needs to be heparinized. One method of making materials non-thrombogenic is disclosed in our copending application regarding the fibers wherein heparin was used. Another method of making certain materials non-thrombogenic, particularly epoxy resins is disclosed in application, Ser. No. 39,858, filed May 20, 1970, wherein certain polyethylene glycols, polypropylene glycols and the like are used.

The disposable cartridge shown in the FIGURE can be made out of polymethyl methacrylate and the blood does not come in contact with this material. The blood being processed flows through the hollow fibers, and gaskets 13 and necked-down portions 14 serve to transport the blood directly from the hollow fibers without contacting the polymethyl methacrylate case of the disposable cartridge. Non-thrombogenicity is provided by fabricating all the blood contacting surfaces, including the blood headers, seals and fiber potting materials, from a non-thrombogenic epoxy, i.e., 13 and 14 of the FIGURE and the materials used to pot the fibers of the disposable cartridge are all made from non-thrombogenic epoxy. This can be either epoxy which has been heparinized according to prior art methods or can be the epoxy of copending application, Ser. No. 39,858 filed May 20, 1970, or other non-thrombogenic material. Body 1, inlet and outlet ports 2 and 3 and the like can also be made from Nylon, polymethyl methacrylate, other plastic or metal since they do not come in contact with blood. The flanges 15 can suitably be stainless steel or other metals since they too do not come in contact with blood.

A prototype hollow fiber kidney of the invention has been designed and built having approximately 2,000 fibers, each of 15 centimeter dialyzing length, i.e., the length inside the disposable cartridge contacted by dialyzing fluid, and a total fiber length of 21.6 centimeters which would be the same length as the disposable cartridge and body 1 of the FIGURE. The fibers used were those described in our copending applications, Ser. No. 102,092 and 102,132 of even date, and each fiber has an inside diameter of about 250-280 microns and a wall thickness of about 50 microns. An actual commercial production model of the artificial kidney might be appreciably larger depending on the dialyzing characteristics of fibers used and in any event would be sized preferably to dialyze completely a patient within about 6 hours.

After the fibers have been prepared in accordance with our copending applications, Ser. No. 102,092 and 102,132 of even date, they are normally stored wet with water to avoid loss of dialyzing properties until ready for potting into a disposable cartridge.

Prior to potting the disposable cartridge is longer than the final 21.6 inches and the fibers are also appreciably longer than the cartridge and extend out both ends of the cartridge. Considerable care is needed in potting to protect the dialyzing area of the fibers from the epoxy potting compound during fabrication. The epoxy compounds used to pot the fibers and bond them to themselves and to the polymethyl methacrylate disposable cartridge case was a non-thrombogenic heparinized semi-rigid epoxy polymer which is known in the art for use where blood is contacted with epoxy. The fibers are potted into the disposable cartridge, potting one end at a time. Prior to potting fibers the disposable cartridge as has been stated is somewhat longer at both ends and the cartridge overall length longer than the final 21.6 centimeters. The disposable cartridge with the fibers extending through the cartridge and out both ends for an appreciable extra length is placed in an upright hollow cylinder closed at the bottom and filled with glycerin. The disposable cartridge containing the hollow fibers is lowered down into the glycerin until all the dialyzing area is covered by glycerin, and the cartridge is suspended at this point in the glycerin. Then the liquid heparinized epoxy is poured around the fibers and floats on top of the glycerin. Care is taken to attempt to displace all the air bubbles from around the fibers to obtain a non-leaking seal potting the fibers to each other and inside the disposable cartridge at the upper end to the disposable cartridge. The heparinized epoxy resin is allowed to cure over a period of several days as necessary at room temperature to pot the fibers in place. The disposable cartridge with the fibers therein and one end potted is then turned upside down and the process repeated to pot the fibers into the other end. A portion of each end of the disposable cartridge is cut off reducing the length of the disposable cartridge to 21.6 centimeters being very careful in the cutting of the fibers portion not to crush fiber ends closing them. Then the edges of each end of the disposable cartridge are beveled as at 12. Obviously other potting methods can also be used.

The method of potting the hollow dialyzing fibers described above can be carried out with any potting resin and other fluids can be used rather than glycerine. It is necessary in this method that the resin be of lower density than the glycerine or equivalent fluid, so the resin will float on top of the glycerine and not penetrate appreciably down the outside of the fibers in the dialyzing area. It is preferable that the potting resin be immiscible or at least not more than partially miscible with the glycerine or equivalent fluid for best potting results otherwise there may be some reduction in dialyzing area of the fibers due to coating by resin.

Several artificial kidneys of the invention of similar design to that described immediately above have been tested, in vivo, testing on human beings. For example, one artificial kidney tested on a human being had 1,850 fibers and each had a total length of 21.6 centimeters and a dialyzing length of 15 centimeters. The inside diameter of a fiber was about 250 microns. The wall thickness was 60 microns. The total dialysis area of the fibers was 0.22 sq. meters, the membrane resistance 100 cm./min. $\times$ $10^{-4}$, the ultrafiltration rate 50 ml./min./m.$^2$ and the transmembrane pressure during testing was 280 mm. of Hg. During the testing on the patient blood was flowed through the fibers and dialyzing fluid around the outside of the fibers. In this testing the artificial kidney performed satisfactory in dialyzing the patient's blood, removing the blood urea nitrogen therefrom in a manner similar to a regular kidney.

Although the invention has been described in terms of the specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A hollow-fiber, artificial kidney with a disposable dialyzing cartridge comprising a first elongated hollow body open at both ends, having inlet and outlet ports near opposite ends of said body, and a gasket located in the inner wall of said body between the inlet and outlet ports to prevent dialyzing fluid from going directly from inlet to outlet; a disposable dialyzing cartridge comprising a second elongated hollow body, sized to be inserted and removed from inside said first body, having one or more openings on the side near each end positioned to communicate with inlet and outlet ports of said first body, and hollow dialyzing fibers running longitudinally inside said second body and potted with resin into a reduced internal opening at each end to prevent leakage of dialyzing fluid around the fibers and out of either end; a gasket at each end of said first and second bodies to prevent dialyzing fluid from leaking into blood, a flange at each end of said bodies, and means joining said flanges to hold said bodies and the gasket at each end in place.

2. An artificial kidney of claim 1 having a necked-down longitudinal portion adjacent each end to facilitate connecting said kidney for use.

3. An artificial kidney of claim 1 wherein the hollow-fibers are quaternized heparinized hollow-fibers of a polymer made from monomeric substances of which at least a sufficient amount of a vinylpyridine is included to provide membranes which on heparinization are non-thrombo-genic and at least 50 percent is acrylonitrile, said hollow-fiber having a urea permeability in the range of 0.005 to 0.075 cm./min. and an ultrafiltration rate in the range of 3 to 300 ml./min./m.$^2$ at 25 mm.Hg. transmembrane pressure, and all portions of said kidney which are in contact with blood are heparinized to prevent clotting of blood.

4. A method for potting hollow dialyzing fibers into an elongated hollow body comprising positioning said body having a reduced opening at each end and hollow dialyzing fibers running longitudinally through said body and out each end, in an upright hollow body closed at the bottom and having glycerine therein, adjusting the level of said elongated body and fibers in the glycerine until the dialyzing area of the fibers is covered by glycerine but the upper end of said elongated body with protruding fibers extends above the glycerine, adding a potting resin of lower density than glycerine around the fibers inside the upper end of said elongated body taking care to displace air bubbles to facilitate obtaining a non-leaking seal of the fibers to each other and to the elongated body, curing said resin to obtain the seal, and repeating the potting operation described herein above at the other end of said elongated body.

5. A disposable dialyzing cartridge usable in a hollow-fiber artificial kidney comprising of an elongated hollow body beveled at both ends and adapted to be inserted and removed from said artificial kidney, having one or more openings on the side at each end positioned to communicate with inlet and outlet dialyzing fluid ports of an artificial kidney, and hollow dialyzing fibers running longitudinally inside said body and potted with resin into a reduced internal opening near each end to prevent leakage of dialyzing fluid around the fibers and out of either end.

6. The disposable dialyzing cartridge of claim 5 wherein said hollow dialyzing fibers are quaternized heparinized hollow-fibers of a polymer made from monomeric substances of which at least a sufficient amount of a vinylpyridine is included to provide membranes which on heparinization are non-thrombongenic and at least 50 percent acrylonitrile, said hollow-fiber having a urea permeability in the range of 0.005 to 0.075 cm/min. and an ultrafiltration rate in the range of 3 to 300 ml/min./m$^2$ at 25 mm. Hg. transmembrane pressure.

* * * * *